US007610576B2

(12) United States Patent
Srinivasamurthy et al.

(10) Patent No.: US 7,610,576 B2
(45) Date of Patent: Oct. 27, 2009

(54) SYSTEM AND METHOD FOR SIMULTANEOUS DISPLAY OF PROCESSES AND ASSOCIATED FILES

(75) Inventors: Guruprasad Srinivasamurthy, Cupertino, CA (US); Yue Fang, Mountain View, CA (US); Zhong Zhang, Los Altos, CA (US); Pavan Bayyapu, Sunnyvale, CA (US)

(73) Assignee: SAP AG, Walldorf (DE)

( * ) Notice: Subject to any disclaimer, the term of this patent is extended or adjusted under 35 U.S.C. 154(b) by 638 days.

(21) Appl. No.: 11/037,143

(22) Filed: Jan. 19, 2005

(65) Prior Publication Data

US 2006/0161899 A1 Jul. 20, 2006

(51) Int. Cl.
*G06F 9/44* (2006.01)
(52) U.S. Cl. .................. 717/105; 717/109; 717/113; 717/125; 705/7
(58) Field of Classification Search .......... 717/105, 717/109, 113, 125, 132
See application file for complete search history.

(56) References Cited

U.S. PATENT DOCUMENTS

| | | | | |
|---|---|---|---|---|
| 6,970,844 B1* | 11/2005 | Bierenbaum | ........... | 705/39 |
| 7,035,837 B2* | 4/2006 | Reulein et al. | ........... | 707/1 |
| 7,096,222 B2* | 8/2006 | Kern et al. | ........... | 707/100 |
| 7,159,183 B1* | 1/2007 | Kudukoli et al. | ........... | 715/762 |
| 7,200,838 B2* | 4/2007 | Kodosky et al. | ........... | 717/116 |
| 7,206,730 B2* | 4/2007 | Pochayevets et al. | ........... | 703/14 |
| 7,210,117 B2* | 4/2007 | Kudukoli et al. | ........... | 717/100 |
| 7,234,140 B2* | 6/2007 | Dortmans | ........... | 718/100 |
| 7,266,807 B2* | 9/2007 | Takano et al. | ........... | 717/111 |
| 7,346,888 B1* | 3/2008 | Srinivasan et al. | ........... | 717/105 |
| 7,454,749 B2* | 11/2008 | Oberdorfer | ........... | 718/1 |
| 7,472,379 B2* | 12/2008 | Chessell et al. | ........... | 717/132 |
| 7,496,912 B2* | 2/2009 | Keller et al. | ........... | 717/174 |
| 7,506,302 B2* | 3/2009 | Bahrami | ........... | 717/100 |
| 2002/0091990 A1* | 7/2002 | Little et al. | ........... | 717/105 |
| 2003/0018512 A1* | 1/2003 | Dortmans | ........... | 705/9 |
| 2003/0034998 A1* | 2/2003 | Kodosky et al. | ........... | 345/736 |
| 2003/0167455 A1* | 9/2003 | Iborra et al. | ........... | 717/105 |
| 2003/0177046 A1* | 9/2003 | Socha-Leialoha | ........... | 705/7 |
| 2003/0233343 A1* | 12/2003 | Li | ........... | 707/1 |
| 2004/0019873 A1* | 1/2004 | Pochayevets et al. | ........... | 717/101 |
| 2004/0133876 A1* | 7/2004 | Sproule | ........... | 717/105 |
| 2004/0260590 A1* | 12/2004 | Golani et al. | ........... | 705/8 |
| 2004/0260628 A1* | 12/2004 | Minton et al. | ........... | 705/30 |
| 2005/0049906 A1* | 3/2005 | Leymann et al. | ........... | 705/8 |

(Continued)

OTHER PUBLICATIONS

Sheth et al., "An Overview of Workflow Management: From Process Modeling to Workflow Automation Infrastructure", @1995, Kluwer Academic Publishers, Boston, pp. 119-153.*

(Continued)

*Primary Examiner*—Tuan Q Dam
*Assistant Examiner*—Marina Lee
(74) *Attorney, Agent, or Firm*—Kenyon & Kenyon LLP

(57) ABSTRACT

A method and system display a plurality of processes in a first portion of the display and simultaneously display a flow diagram of the selected one of the processes in a second portion of the display. Selection of any of the plurality of processes by a user in the first portion of the display causes display of a corresponding flow diagram of the selected process in the second portion of the display.

23 Claims, 9 Drawing Sheets

U.S. PATENT DOCUMENTS

2006/0085681 A1* 4/2006 Feldstein et al. .............. 714/25
2006/0206856 A1* 9/2006 Breeden et al. ............. 717/101
2007/0143205 A1* 6/2007 Starmanns et al. ............ 705/37
2007/0256058 A1* 11/2007 Marfatia et al. ............. 717/137

OTHER PUBLICATIONS

Aversano et al. "Business process reengineering and workflow automation: a technology transfer experience",2002, The Journal of System and Software, pp. 29-44.*

* cited by examiner

SYSTEM AND METHOD FOR SIMULTANEOUS DISPLAY OF PROCESSES AND ASSOCIATED FILES

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

In today's complex software environment, information may be represented in a myriad of different formats, each of which define a particular arrangement of data that can be processed and/or stored by a computer. In some computing environments, it is desirable to represent information in a process or flow. Any particular computing process can be represented in a flow diagram for easier visual comprehension of the flow of the particular process. For example, a login process could be represented in a flow diagram such that the various steps of the process are easy to visualize.

Such processes are often configured within software in a computer in particular types of files. For example, the process may be configured within a series of configuration files. The files may also be configured in other types of files, such as application files, or in a combination of different types of files, such as in a combination of configuration and application files.

These types of files defining the flow of a particular process are often numerous, and can be difficult to work with, particularly for a user who is not an expert with such computer processes. Working with the flow of such a process can be very difficult when all one has to work with is such configuration and application files. Further, modifying such files can also be difficult, particularly for the non-expert user. It can also be very difficult to visualize such a process and the flow of the process, particularly when the process is part of a series of related processes.

Accordingly, there is a need in the art for an improved system and method for taking such process files and automatically displaying such files and associated flow diagrams in a format that is easy to visualize and use.

DETAILED DESCRIPTION

Embodiments of the present invention implement a method and system that display a plurality of processes in a first portion of the display and simultaneously display a flow diagram of the selected one of the processes in a second portion of the display. Selection of any of the plurality of processes by a user in the first portion of the display causes display of a corresponding flow diagram of the selected process in the second portion of the display. Details of embodiments of the invention are further discussed below.

Figure 1:
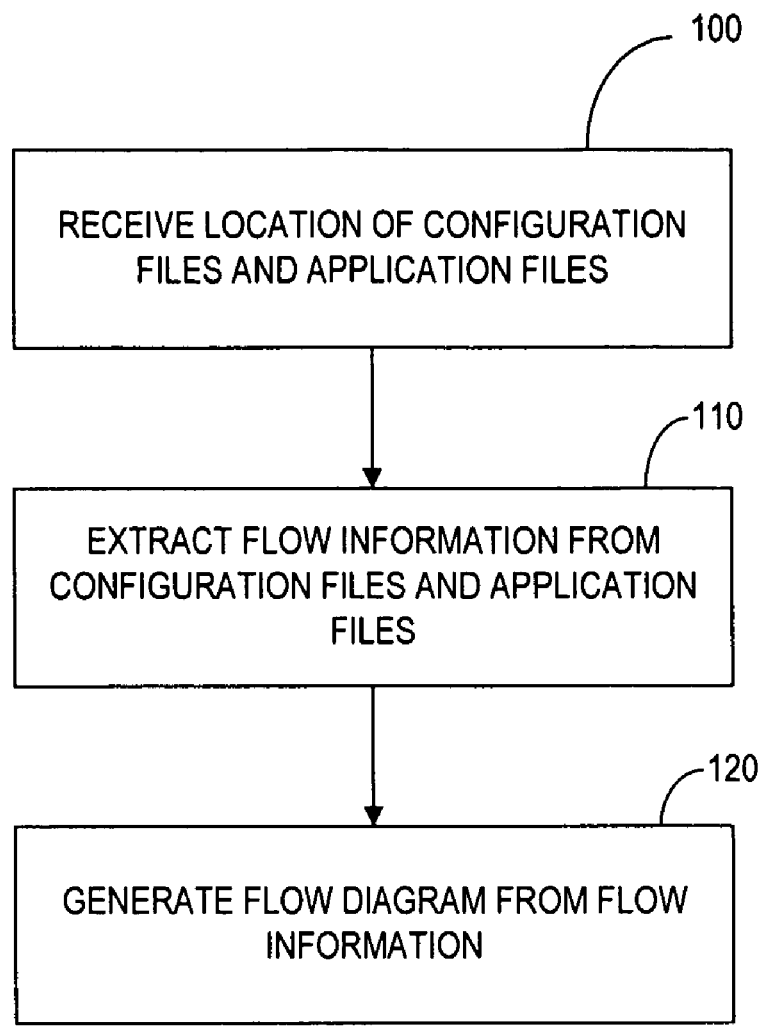
FIG. 1 is a flowchart illustrating a process in accordance with an embodiment of the present invention.

FIG. 1 depicts a process in accordance with an embodiment of the present invention. In step 100, an indication of a location of the configuration files and the application files is received. As further explained below, this indication may be input by a user that wants to automatically generate a flow diagram of the process flow between configuration files and application files for a process that has been predefined.

In step 110, flow information is extracted from the configuration files and from the application files. Details of the extraction of the flow information from the configuration files and application files are further discussed below. The flow information is information contained in the configuration files and in the application files that indicates one or more destination nodes from the configuration or application file and/or a flow label. The flow information may include flow labels and/or flow destinations.

In step 120, the flow diagram displaying a process flow between the configuration files and the application files is then generated from the flow information. The generated flow diagram and the method used to generate it are further explained below in conjunction with FIGS. 2 and 3.

Figure 2:
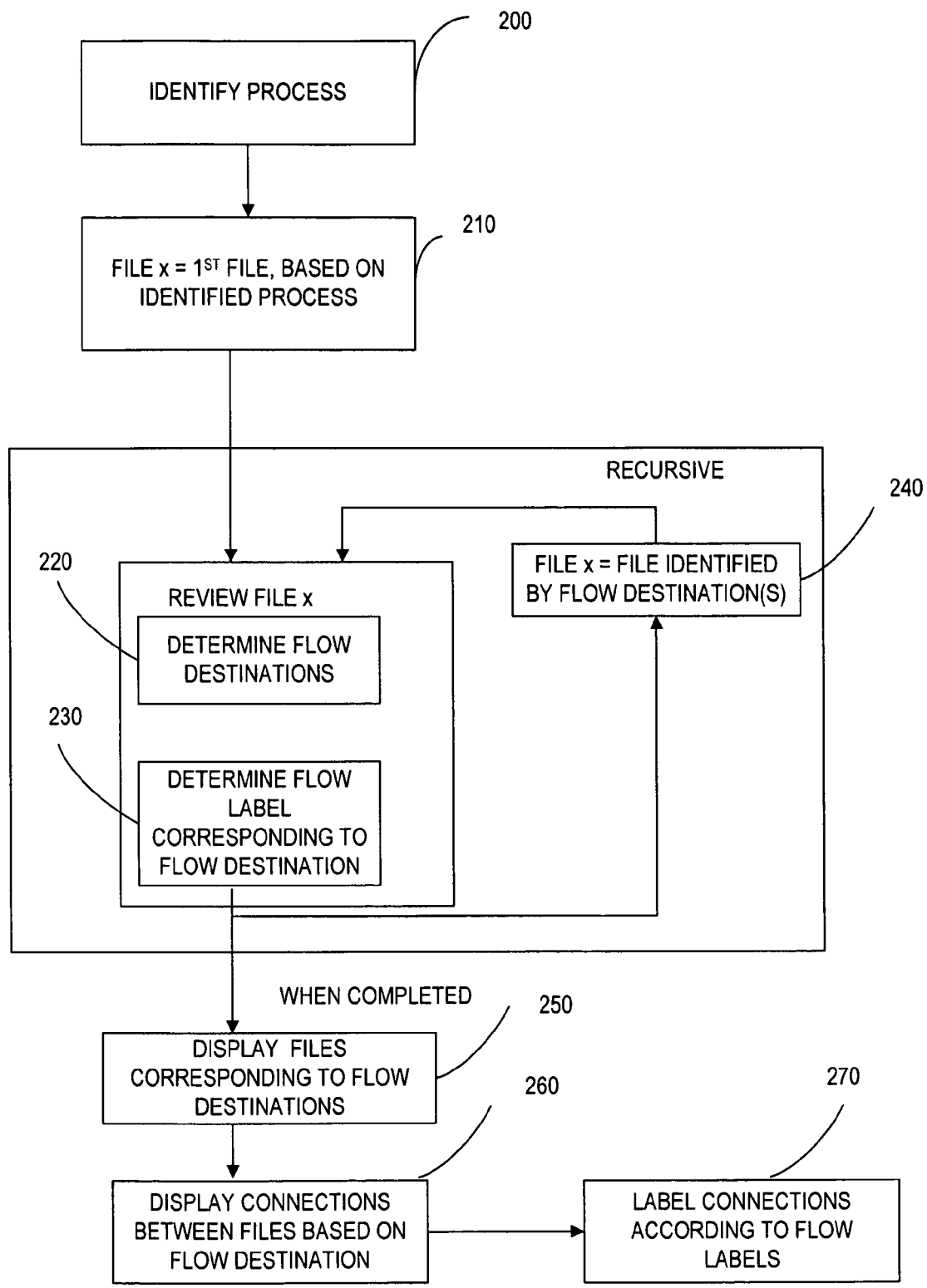
FIG. 2 is a flowchart illustrating a process in accordance with an embodiment of the present invention.

FIG. 2 illustrates a process in accordance with an embodiment of the present invention. In step 200, a process is identified by receipt of the indication of the location of the file or by other means. Each process my have one or a plurality of configuration or application files associated with it. For each file x, the present invention may process the files to determine flow destinations and/or flow labels.

In step 210, a first file in the process is identified. The flow destination for the file is determined in step 220, and the flow label (if any) is determined in step 230, as further described below. In 240, the flow destination may be used to identify additional files, and steps 220 and 230 of determining the additional flow destinations and/or flow labels will continue until all destinations and labels in the process are determined.

Figure 3:
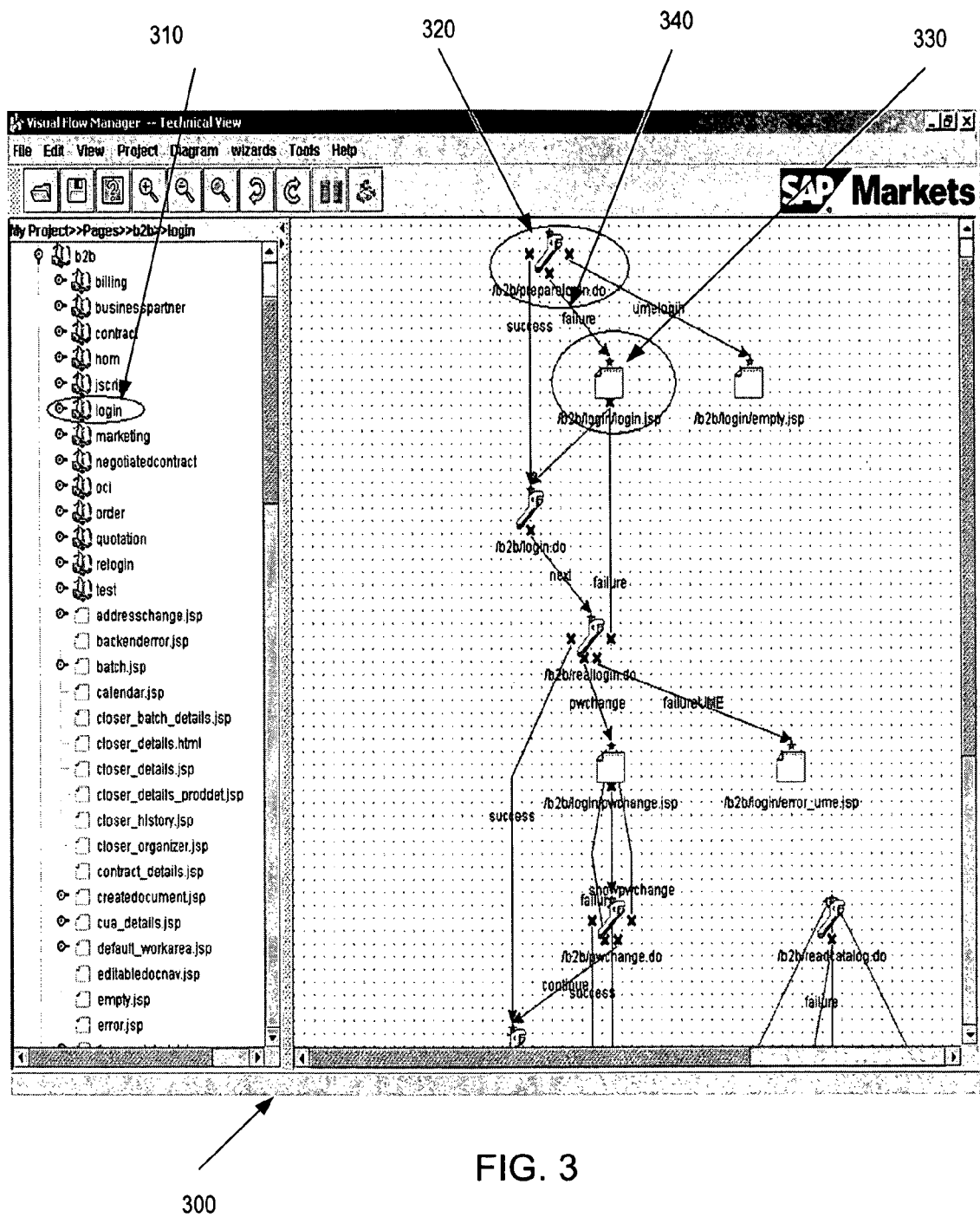
FIG. 3 is a screenshot of a flow diagram in accordance with an embodiment of the present invention.

When all of the flow destinations and/or flow labels are determined, the files may be displayed along with the corresponding flow destinations in step 250. In step 260, the connections between the files may be displayed based on the determined flow destinations. In step 270, the connections may be labeled according to the flow labels. These steps are further illustrated below FIG. 3 illustrates a flow diagram 300 that has been generated in accordance with an embodiment of the present invention. The flow diagram 300 has been generated in accordance with a predefined login process that includes application files and configuration files. The flow diagram 300 that is illustrated in FIG. 3 is a flow of a login process 310. The flow diagram 300 illustrates configuration files, application files, and the flow of the process between them. In the flow diagram 300, spanner wrench icons are used to represent configuration files and document icons are used to represent application files, although any type of icon may be used. A configuration file is represented in the flow diagram by the spanner wrench 320 labeled "/b2b/preparelogin.do". This icon could correspond to the following configuration entries in config.xml:

```
<action path="/b2b/preparelogin"
type="com.sapmarkets.isa.isacore.action.b2b.PrepareLoginAction">
    <forward name="success" path="/b2b/login.do"/>
    <forward name="umelogin" path="/b2b/login/empty.jsp"/>
    <forward name="failure" path="/b2b/login/login.jsp"/>
</action>
```

Flow labels and flow destinations are information that may be extracted from the configuration file for use in generating the flow diagram in accordance with embodiments of the present invention. In the particular example shown above, three labels, "success", "failure" and "umelogin" are extracted from the configuration file. Also, three corresponding flow destinations are extracted, namely "/b2b/login.do", "/b2b/login/empty.jsp" and "/b2b/login/login.jsp". The flow label 340 illustrated in FIG. 2 is labeled "failure". The flow destination 330 is labeled "/b2b/login/login.jsp". The flow labels and flow destinations are useful for a user in visualizing the flow of the process.

The flow destination 330 "/b2b/login/login.jsp" is an application file, which in this case is a .jsp file. Other types of application files could also be used, such as HTML (HyperText Markup Language) files. The application files also have flow information extracted from them as described above. The "/b2b/login/login.jsp" application file may include:

```
<form method="POST" action='<isa:webappsURL name=
"b2b/login.do"/>'
name="login_form"
   onSubmit="return checkFields( )">
```

This application file is tokenized to extract the flow destination. This is accomplished by breaking the .jsp file from a long character stream into small parts (tokens), from which the flow destination and any flow labels may be extracted. For example, this may be accomplished by breaking the web page file from a long character stream into a series of small meaningful parts (tokens), so it is easy to operate on. In the example, the following line from a application file may be broken into a series of tokens:

<form action='<isa:webappsURL name="b2b/login.do"/>'name="loginForm"> may be broken into ["form", "action", "isa:webappsURL", "name", "b2b/login.do", "name", "loginForm"]. This may be done by using Java's (or some other language's) string operation library. Then the flow destinations can be extracted from those tokens. To achieve this, a coding standard may be used, such as SAP Internet Sales application's web page source file, where all the links are encapsulated by a specific tag (a common approach among business level internet applications). Other coding standards could also be used. The tokens are searched for that correspond to that specific tag, for example, the "isa:webappsURL" token, and then the following token is extracted as the flow destination. In this case, the flow destination "b2b/login.do" is extracted for use in creating the flow diagram. This particular destination does not include a label, but in examples where a label is used, the label is also extracted.

The flow information may be extracted from the configuration files by known techniques. For example, a standard XML package may be used for extraction, such as DOM (Document Object Model) or SAX (Simple API for XML) which are widely available and known. These XML packages may be used to parse the flow information from the files.

The present invention may use any number of application files and configuration files to generate a flow diagram, depending upon the complexity of the process. The application files may be of various types other than the .jsp files illustrated herein. The present invention may be used with a system having stored therein a large number of such processes that each can be used to generate such a flow diagram in accordance with the embodiment. For example, in addition to the "login" process 310 illustrated in FIG. 1, other processes are illustrated such as "billing", "businesspartner", etc. Each of these processes could be used to generate a flow diagram in accordance with embodiment of the invention.

Embodiments of the invention may be used with a plurality of processes, to generate a plurality of flow diagrams. The plurality of processes may be related, and even grouped together, such as, for example, in a common group or project.

Figure 4:
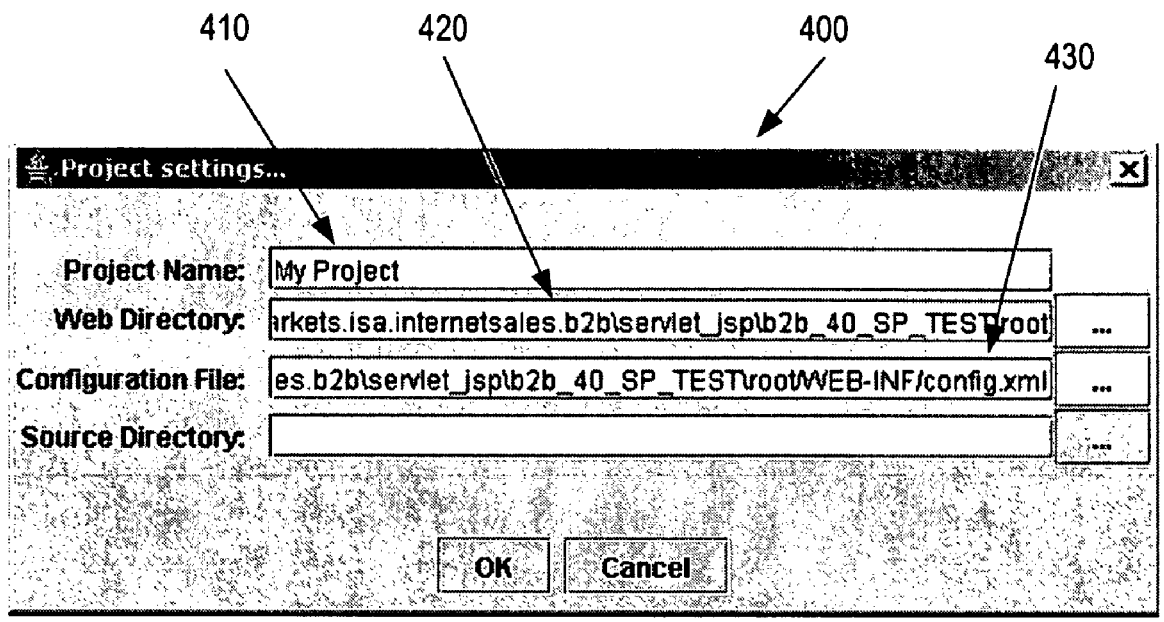
FIG. 4 is a block diagram that depicts a user computing device in accordance with an embodiment of the present invention.

FIG. 4 illustrates a screen shot 400 that may be used in accordance with the present invention. The screen shot 400 includes a project name 410, an application file location 420 and a configuration file location 430. The screen shot 400 is generated to prompt a user to enter the location of application files and configuration files that the present invention will use to extract the flow information used to generate the flow diagram or diagrams. Alternatively, the screenshot 400 could be used to only require entry of the project name, and the location of the configuration files and application files could automatically be generated.

Embodiments of the present invention extract the flow destinations and flow labels for each configuration file and application file, and creates the flow diagram by generating an icon for the destinations, with arrows between each destination indicating the flow. The flow labels are associated with the corresponding arrow to show a result that will cause the process to move to a particular destination. Any type of icon or symbol may be used, and the icons shown herein are only ones of many possible examples that could be used. The flow diagrams may be rendered and displayed on a screen in any of many methods known to those of skill in the art.

The screenshot 400 is shown with the project name "My Project." As may be seen with reference to FIG. 2, the project "My Project" not only includes the "login" process, but also includes the various other processes such as "billing", "businesspartner", etc. Embodiments of the present invention can be used to simultaneously generate a plurality of flow diagrams for a plurality of processes within a project, or can be used to generate one or more flow diagrams for a single process. If a project includes a plurality of processes and it is desired to generate the flow diagrams for all of the processes, embodiments of the present invention will do so by receiving the location of the configuration files and application files, and extracting the flow information for each process. The extracted flow information is then associated with the corresponding process, so that the separate flow diagrams may be formed. If the flow information is not associated with a particular process, when a user wants to display the flow diagram for a process, any flows related to it may be dynamically formed.

Figure 5:
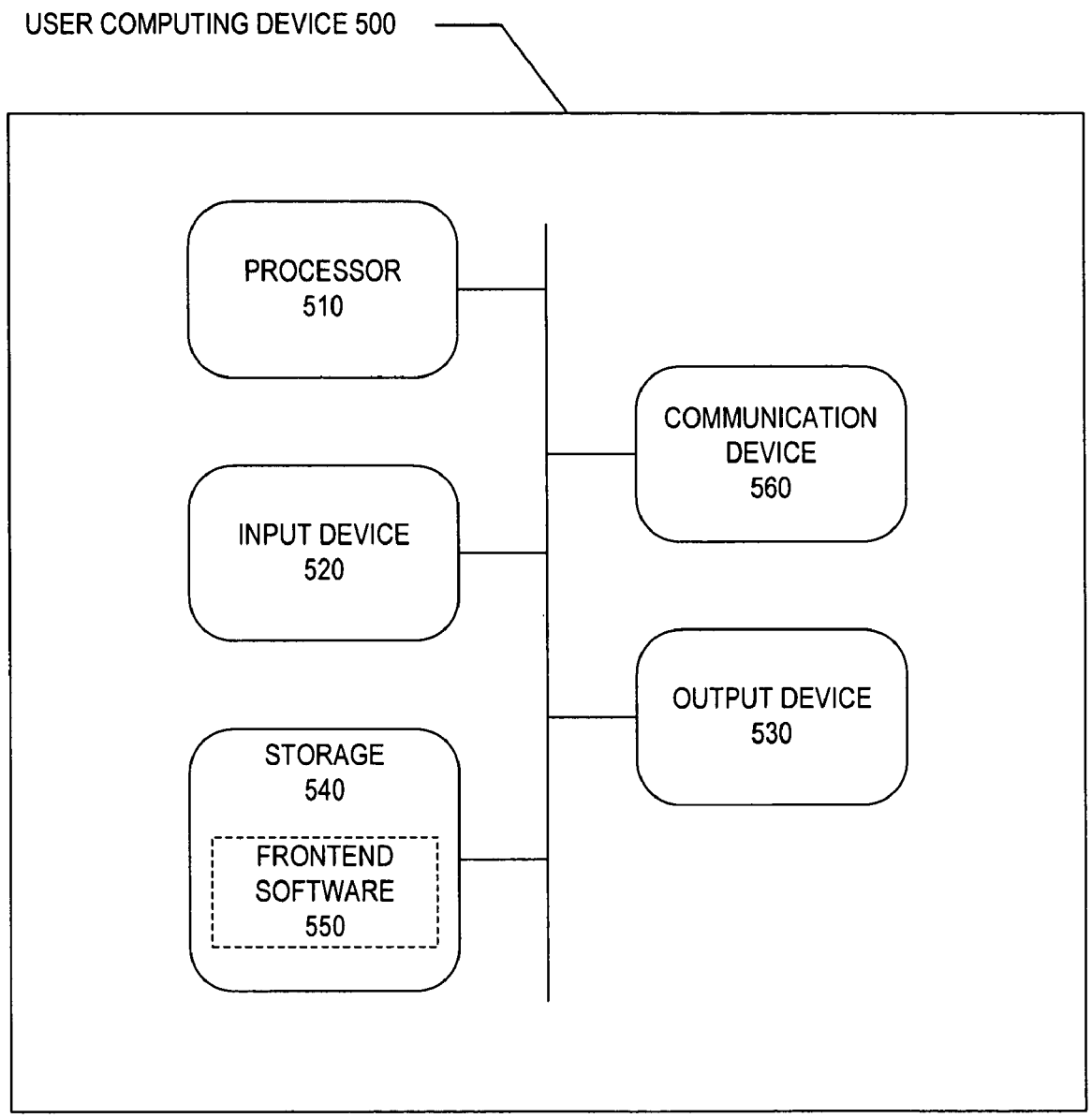
FIG. 5 is a block diagram that depicts a user computing device in accordance with an embodiment of the present invention.
Figure 6:
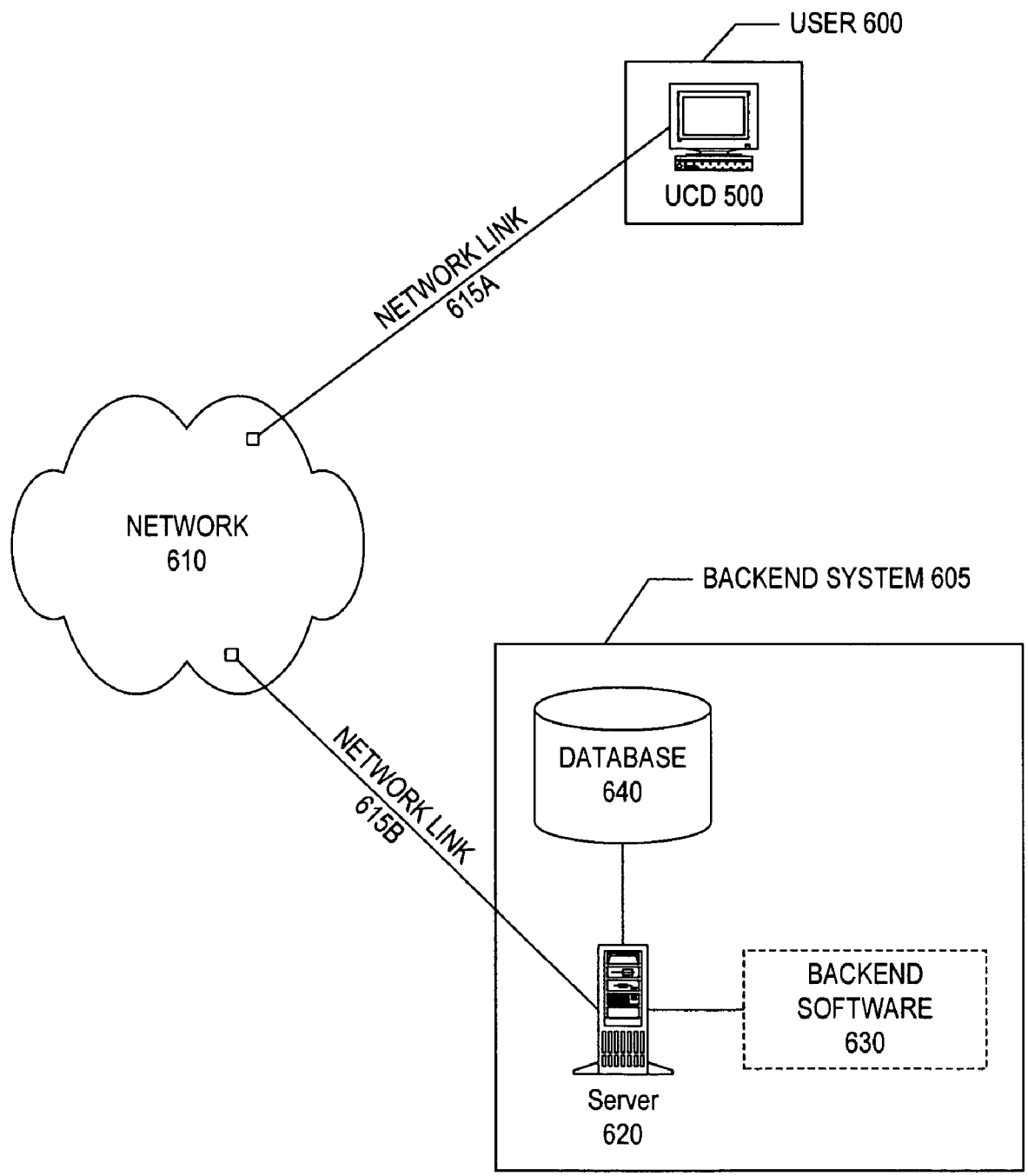
FIG. 6 is a network architecture in accordance with an embodiment of the present invention.

FIGS. 5 and 6 illustrate the components of a basic computer and network architecture in accordance with an embodiment of the present invention. Embodiments of the present invention may not need all of the elements described herein. FIG. 5 depicts user computing device 500, which may be a personal computer, workstation, handheld personal digital assistant ("PDA"), or any other type of microprocessor-based device. User computing device 400 may include one or more of processor 510, input device 520, output device 530, storage 540, and communication device 560.

Input device 520 may include a keyboard, mouse, pen-operated touch screen or monitor, voice-recognition device, or any other device that provides input. Output device 530 may include a monitor, printer, disk drive, speakers, or any other device that provides output.

Storage 540 may include volatile and nonvolatile data storage, including one or more electrical, magnetic or optical memories such as a RAM, cache, hard drive, CD-ROM drive, tape drive or removable storage disk. Communication device 560 may include a modem, network interface card, or any other device capable of transmitting and receiving signals over a network. The components of user computing device 500 may be connected via an electrical bus or wirelessly.

Software 550, which may be stored in storage 540 and executed by processor 510, may include, for example, the client side of a client/server application that embodies the functionality of the present invention (e.g., automatically generating the flow diagrams). Thus software for executing the above-described functionality may be placed in storage 540 and executed by processor 510 to automatically generate the flow diagrams.

FIG. 6 illustrates a network architecture that could be used in accordance with an embodiment of the present invention. According to one particular embodiment, when user 600 invokes a client/server application hosted by Enterprise System 605, client software 650 of user computing device 600 communicates with server software 630 (e.g., the server side of the client/server application) of server 620 via network link 615a, network 610, and network link 615b. The server software 630 may perform the functionality of the present invention, where a user connects to the backend system via network 610, for example. In this embodiment, the flow diagrams could be generated in Server 620, and displayed at UDC 500.

Network links 615 may include telephone lines, DSL, cable networks, T1 or T3 lines, wireless network connections, or any other arrangement that implements the transmission and reception of network signals. Network 610 may include any type of interconnected communication system, which may implement any communications protocol, which may be secured by any security protocol.

Server 620 includes a processor and memory for executing program instructions as well as a network interface, and may include a collection of servers. In one particular embodiment, server 620 may include a combination of enterprise servers such as an application server and a database server. Database 640 may represent a relational or object database, and may be accessed via a database server.

User computing device 500 and server 620 may implement any operating system, such as Windows or UNIX. Client software 650 and server software 630 may be written in any programming language, such as ABAP, C, C++, Java or Visual Basic.

In other embodiments, application software embodying the functionality of the present invention may be deployed on a standalone machine or through a Web browser as a Web-based application or Web service, for example.

Figure 7:
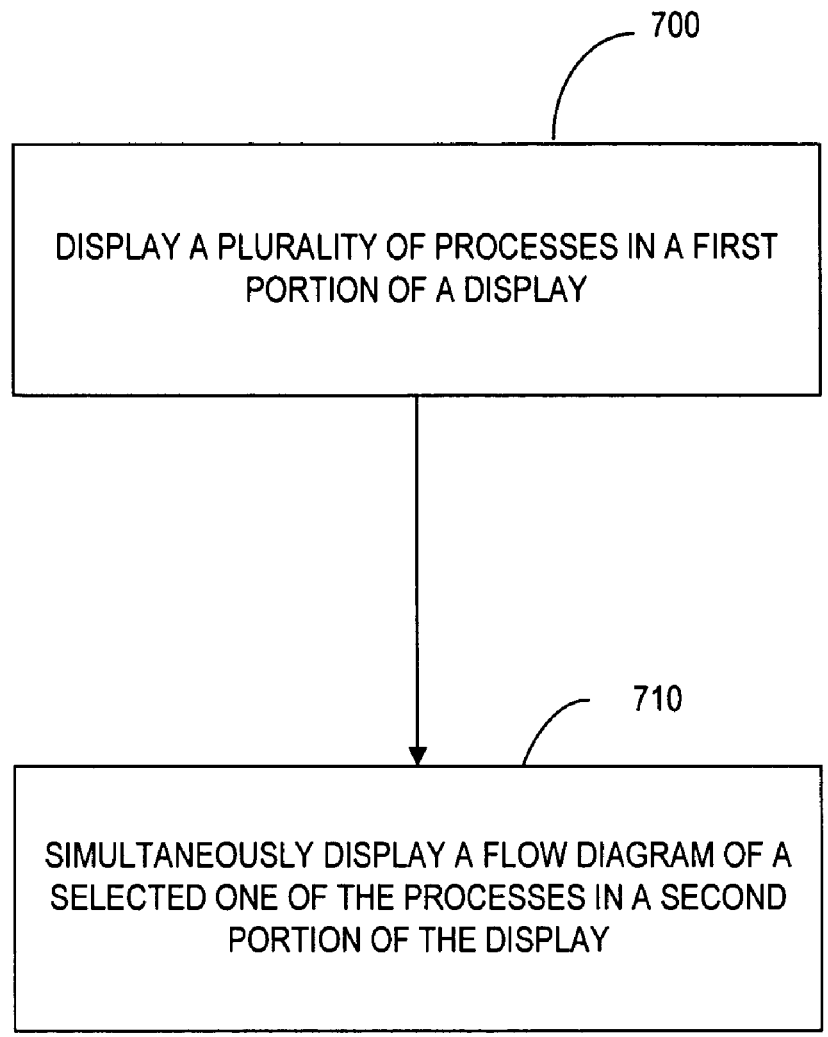
FIG. 7 is a flowchart illustrating a process in accordance with an embodiment of the present invention.

FIG. 7 illustrates a process flow in accordance with an embodiment of the present invention. In a first step 700, a plurality of processes are display in a first portion of a screen. Each of the processes may be selectable by the user. Any method of selection may be useable, such as placing a cursor over the processes and clicking a doubleclicking. The processes may be displayed in a list form, or in another desired form. The processes may have sub-elements also displayed, as further described below.

In a second step 710, a flow diagram of a selected one of the processes is simultaneously displayed in a second portion of the screen. The user may select any of the processes from the first portion of the screen, and the corresponding flow diagram will be displayed in the second portion of the screen. Further details of the simultaneous display of the processes in the first portion of the screen, and display of a flow diagram of the selected process in the second portion of the screen are described below in conjunction with FIGS. 8 and 9.

Figure 8:
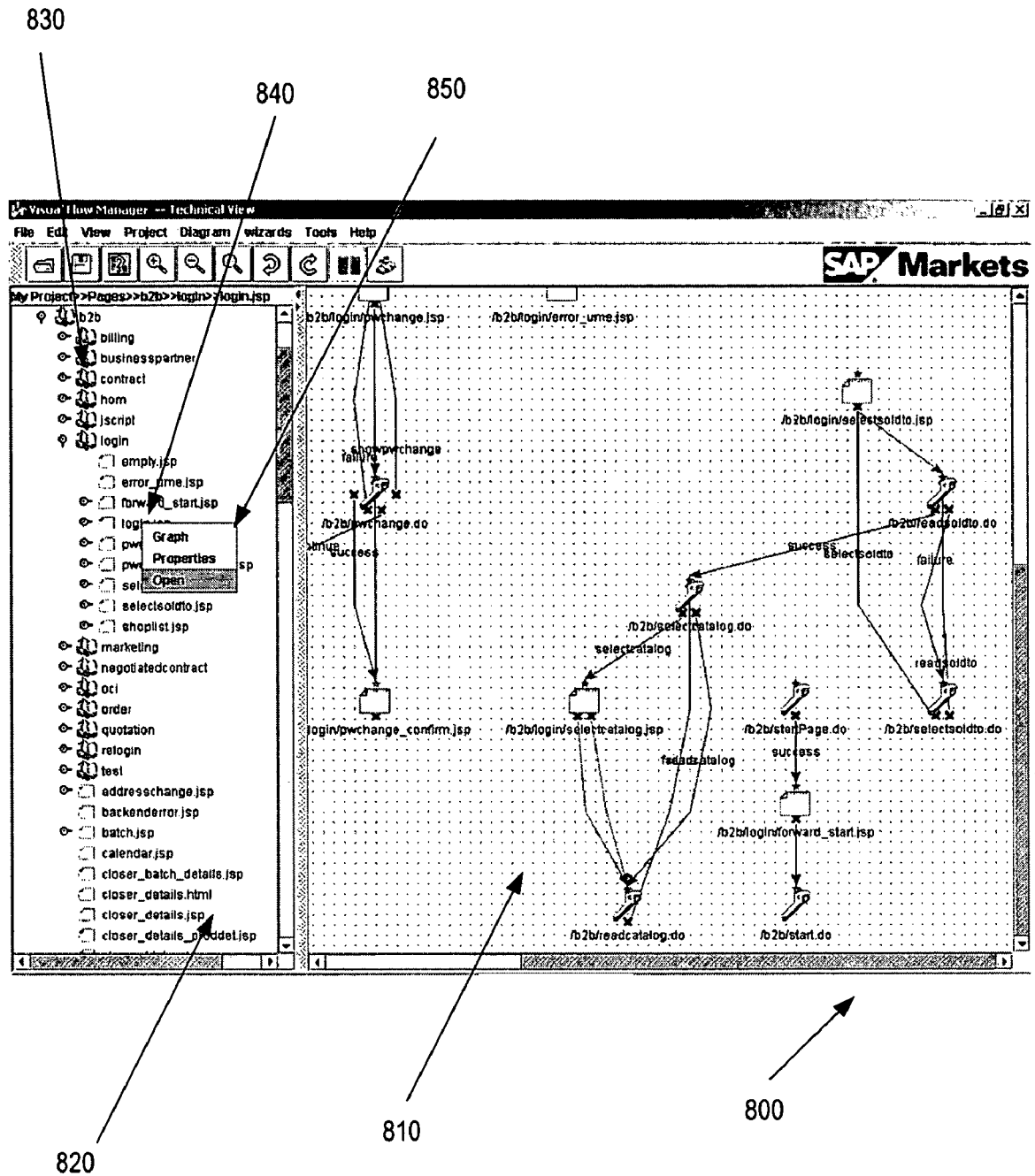
FIG. 8 is a in accordance with an embodiment of the present invention.

FIG. 8 illustrates a screenshot 800 in accordance with an embodiment of the present invention. The screenshot 800 includes an area 810 graphically displaying a process flow generated from configuration files and application files as explained above, and an area 820 displaying a plurality of processes 830 used to generate such process flows. In this example, the portion of area 830 displayed includes the following processes: billing, businesspartner, contract, hom, jscript, login, marketing, negotiatedcontract, oci, order, quotation, relogin and test. Any number of such processes may be displayed, and additional processes may be included in portions of area 820 that can be viewed by user manipulation of screenshot 800.

Some of the processes may have associated application files or configuration files that define the process and may be displayed as a subset of the process. For example, the login process in area 830 includes a series of application files shown as associated with the login process. In the example in screenshot 800, the login process displayed in area 830 has a plurality of associated application files displayed as nested within the login process, including application files empty.jsp, error_ume.jsp, forward-start.jsp, login.jsp 840, etc. Any number of such application files may be displayed in association with a process. In the example of screenshot 800, configuration files are not shown, but would be shown in another area of the process.

The "login" process is displayed in area 810. In the area 810 in screenshot 800, the login process is shown in a magnified view so that not all elements of the flow process are viewable without manipulation, but this is only one of many possible views. For example, by de-magnifying the view, all elements of the process may be viewable, or further magnification could be applied as desired. The flow diagram in area 810 illustrates configuration files, application files, and the flow of the process between them. In the flow diagram, spanner wrench icons are used to represent configuration files and document icons are used to represent application files as described above, although any type of icon may be used.

The login process, or any of the other processes, may be selected for display in area 810 by the user. For example, a user may be able to select one of the processes in area 830 for display in area 810 by a method such as placing a cursor on the desired process in area 830 and selecting the process by clicking or doubleclicking, although any selection method could be used.

The present invention also advantageously allows the user to open the actual configuration or application files. As shown in FIG. 8, the user can manipulate the configuration or application files, such as opening the file. For example, the user may open box 850 which includes the option of opening the file. In the example illustrated in FIG. 8, the login.jsp file is selected to be opened, so the user may view the actual file. This allows the user to view and/or manipulate the configuration file or application file. Other manipulations of the file may also be selected using a method such as box 850, such as display of a graph or display of properties of the file. Display of the file is further described below in connection with FIG. 9.

Figure 9:
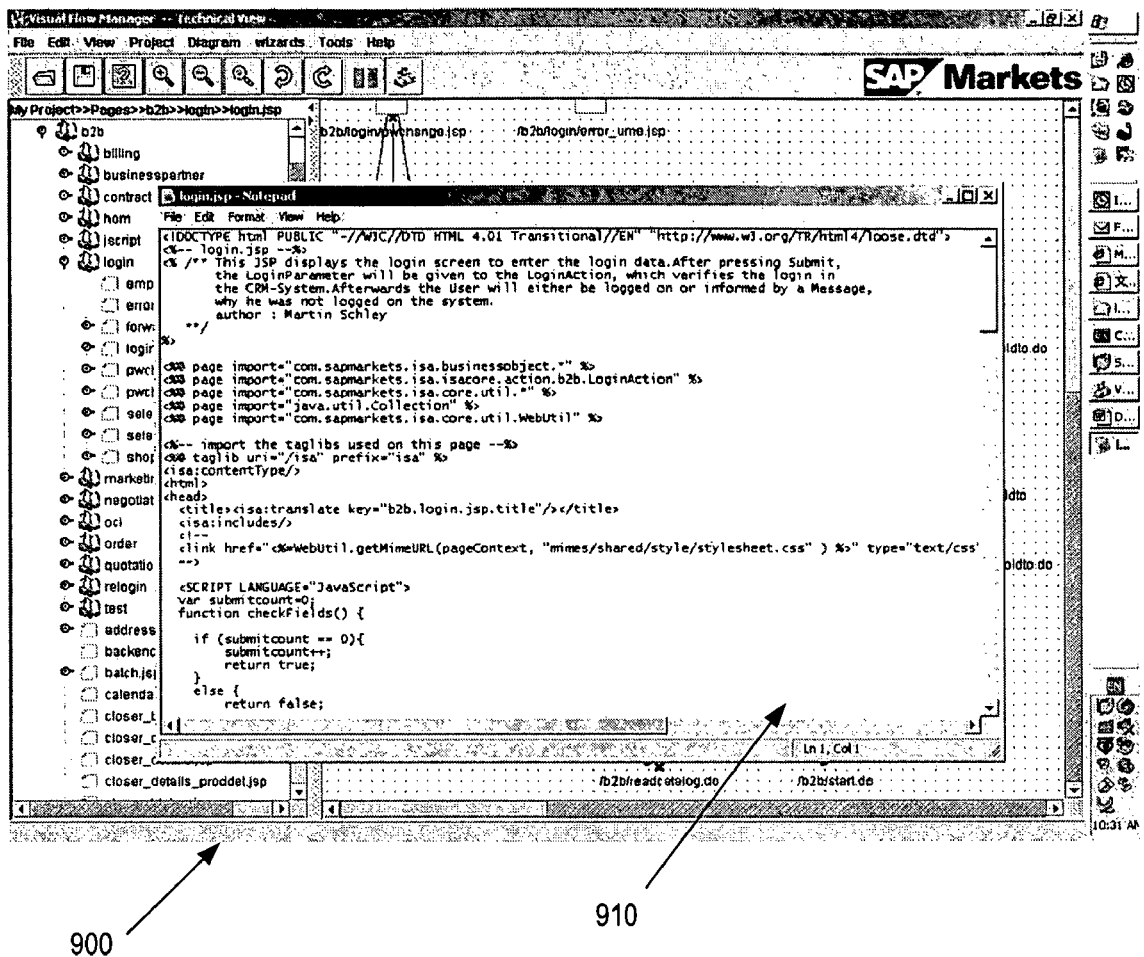
FIG. 9 is a in accordance with an embodiment of the present invention.

FIG. 9 illustrates a screenshot 900 in accordance with an embodiment of the present invention. The screenshot 900 was generated when the login.jsp file was selected to open as illustrated in conjunction with FIG. 8. Any of the configuration files or application files may be selected for display.

Screenshot 900 includes an area 910 that is superimposed over the screenshot of FIG. 8. Area 910 includes the contents of the configuration file or application files that was selected for display. The user can view the contents of the selected file, and perform various modifications to the file as desired. For example, the user can make modifications to the file by a method such as selecting the "Edit" header, select a format for display of the file by selecting the "Format" header, save any modifications by a method such as selecting the "File" header, etc.

The invention disclosed in the above-described embodiments provides an easy to use system and method that displays a plurality of processes and configuration and/or application files that define the processes in a first portion of a screen and displays a flow diagram of one of the processes in a second portion of the display. The user may select one of the processes in the first portion of the display, and change selection between the processes. Upon changing selection in the first portion of the display between first and second processes, the flow diagram in the second portion of the display is automatically updated to the flow diagram of the second process. This allows for easy manipulation by a user between complicated processes.

By displaying the sub-elements of the processes in association with the corresponding processes in the first portion of the display, the user is easily able to navigate to the details of the sub-elements, and to modify the sub-elements if desired. For example, the user can open one of the sub-elements, such as an application file, and see the details of that file. The user can then perform functions on the file, such as an editing function as described above.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A computer-implemented method comprising:
   selecting a first process from a plurality of processes;
   receiving an indication of a location of configuration files and a location of application files associated with the first process, the first process being defined by the configuration files and the application files;
   automatically extracting flow destinations and flow labels from the configuration files and the application files for inclusion in a flow diagram by:
   identifying a first file of the configuration files and the application files in the first process;
   separating the first file into a plurality of tokens;
   searching the plurality of tokens for tokens corresponding to a predetermined tag of a coding standard;
   extracting the flow destinations and the flow labels from the tokens corresponding to the predetermined tag; and
   recursively repeating, until each of the configuration files and the application files is identified, said identifying, said separating, said searching, and said extracting for a next file of the configuration files and application files, wherein the next file is identified from the flow destination of a previous file;
   generating the flow diagram from the extracted flow destinations and flow labels;
   displaying the plurality of processes in a first portion of a screen display; and
   simultaneously displaying the generated flow diagram of the first process in a second portion of the screen display, wherein selection of a second process of the plurality of processes by a user in the first portion of the display causes display of a corresponding flow diagram of the second process in the second portion of the display.

2. The method of claim 1, wherein the flow diagram includes icons representing the flow labels and/or the flow destinations.

3. The method of claim 2, wherein the flow diagram includes a flow direction indicator indicating a direction of process flow between ones of the icons representing the flow destinations.

4. The method of claim 1, further comprising:
   receiving an indication of a selection of another one of the processes; and
   changing the second portion of the display from displaying the flow diagram of the selected one of the processes to displaying a flow diagram of the another one of the processes.

5. The method of claim 1, further comprising displaying sub-elements in association with at least one of the processes in the first portion of the display.

6. The method of claim 5, wherein the sub-elements comprise a list of configuration files and/or application files defining the associated process.

7. The method of claim 6, wherein simultaneously displaying the flow diagram in the second portion of the screen comprises displaying the configuration files and the applications files as flow destinations, displaying a flow direction indicator between ones of the flow destinations indicating a direction of process flow, and displaying flow labels associated with corresponding ones of the flow direction indicators.

8. The method of claim 6, further comprising, upon user selection for opening of one of the configuration files or application files in the first portion of the screen, displaying details of the selected one of the configuration files or application files.

9. The method of claim 8, wherein displaying details of the selected one of the configuration files or application files comprises displaying details of the selected one of the configuration files or application files superimposed over the first portion and/or second portion of the screen.

10. The method of claim 6, further comprising displaying manipulation options for selection by a user in association with the displayed details of the selected one of the configuration files or application files.

11. The method of claim 10, wherein the manipulation options include an edit option that upon selection allows a user to edit the details of the displayed details of the selected one of the configuration files or application files.

12. An apparatus for simultaneously displaying a plurality of processes and a flow diagram of a selected one of the processes, comprising:

a display;

a processor; and a memory coupled to the processor, the memory storing instructions adapted to be executed by the processor to:
- select a first process from a plurality of processes;
- receive an indication of a location of configuration files and a location of application files associated with the first process, the first process being defined by the configuration files and the application files;
- automatically extract flow destinations and flow labels from the configuration files and the application files for inclusion in a flow diagram by:
  - identify a first file of the configuration files and the application files in the first process;
  - separate the first file into a plurality of tokens;
  - search the plurality of tokens for tokens corresponding to a predetermined tag of a coding standard;
  - extract the flow destinations and the flow labels from the tokens corresponding to the predetermined tag; and
  - recursively repeat, until each of the configuration files and the application files is identified, said identifying, said separating, said searching, and said extracting for a next file of the configuration files and application files, wherein the next file is identified from the flow destination of a previous file;
- generate the flow diagram from the extracted flow destinations and flow labels;
- display the plurality of processes in a first portion of the display; and
- simultaneously display the generated flow diagram of the first processes in a second portion of the display,
- wherein selection of a second process of the plurality of processes by a user in the first portion of the display causes display of a corresponding flow diagram of the second process in the second portion of the display.

13. The apparatus of claim 12, wherein the flow diagram includes icons representing the flow labels and/or the flow destinations.

14. The apparatus of claim 13, wherein the flow diagram includes a flow direction indicator indicating a direction of process flow between ones of the icons representing the flow destinations.

15. The apparatus of claim 12, wherein the memory includes further instructions adapted to be executed by the processor to:
- receive an indication of a selection of another one of the processes; and
- change the second portion of the display from displaying the flow diagram of the selected one of the processes to displaying a flow diagram of the another one of the processes.

16. The apparatus of claim 12, wherein the memory includes further instructions adapted to be executed by the processor to display sub-elements in association with at least one of the processes in the first portion of the display.

17. The apparatus of claim 16, wherein the sub-elements comprise a list of configuration files and/or application files defining the associated process.

18. The apparatus of claim 17, wherein the instructions to simultaneously display the flow diagram in the second portion of the screen comprises instructions to display the configuration files and the applications files as flow destinations, display a flow direction indicator between ones of the flow destinations indicating a direction of process flow, and display flow labels associated with corresponding ones of the flow direction indicators.

19. The apparatus of claim 17, wherein the instructions adapted to be executed by the processor further include instructions to display details of the selected one of the configuration files or application files, upon user selection for opening of one of the configuration files or application files in the first portion of the screen.

20. The apparatus of claim 19, wherein the instructions to display details of the selected one of the configuration files or application files comprises instructions to display details of the selected one of the configuration files or application files superimposed over the first portion and/or second portion of the screen.

21. The apparatus of claim 17, wherein the instructions adapted to be executed by the processor further include instructions to display manipulation options for selection by a user in association with the displayed details of the selected one of the configuration files or application files.

22. The apparatus of claim 21, wherein the manipulation options include an edit option that upon selection allows a user to edit the details of the displayed details of the selected one of the configuration files or application files.

23. A computer-readable storage medium storing a set of instructions adapted to be executed by a processor to perform a method comprising:
- selecting a first process from a plurality of processes;
- receiving an indication of a location of configuration files and a location of application files associated with the first process, the first process being defined by the configuration files and the application files;
- automatically extracting flow destinations and flow labels from the configuration files and the application files for inclusion in a flow diagram by:
  - identifying a first file of the configuration files and the application files in the first process;
  - separating the first file into a plurality of tokens;
  - searching the plurality of tokens for tokens corresponding to a predetermined tag of a coding standard;
  - extracting the flow destinations and the flow labels from the tokens corresponding to the predetermined tag; and
  - recursively repeating, until each of the configuration files and the application files is identified, said identifying, said separating, said searching, and said extracting for a next file of the configuration files and application files, wherein the next file is identified from the flow destination of a previous file;
- generating the flow diagram from the extracted flow destinations and flow labels;
- displaying the plurality of processes in a first portion of a screen display; and
- simultaneously displaying the generated flow diagram of the first process in a second portion of the screen display,
- wherein selection of a second process of the plurality of processes by a user in the first portion of the display causes display of a corresponding flow diagram of the second process in the second portion of the display.

* * * * *

UNITED STATES PATENT AND TRADEMARK OFFICE
CERTIFICATE OF CORRECTION

PATENT NO. : 7,610,576 B2  Page 1 of 1
APPLICATION NO. : 11/037143
DATED : October 27, 2009
INVENTOR(S) : Srinivasamurthy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 867 days.

Signed and Sealed this

Twelfth Day of October, 2010

David J. Kappos
*Director of the United States Patent and Trademark Office*